US008271195B2

(12) United States Patent
Painter et al.

(10) Patent No.: US 8,271,195 B2
(45) Date of Patent: Sep. 18, 2012

(54) METHOD FOR REPRESENTING LINEAR FEATURES IN A LOCATION CONTENT MANAGEMENT SYSTEM

(75) Inventors: Jeffrey E. Painter, Sugar Grove, IL (US); Vojislav Samsalovic, Chicago, IL (US)

(73) Assignee: Navteq B.V., Veldhoven (NL)

( * ) Notice: Subject to any disclaimer, the term of this patent is extended or adjusted under 35 U.S.C. 154(b) by 637 days.

(21) Appl. No.: 12/362,786

(22) Filed: Jan. 30, 2009

(65) Prior Publication Data

US 2010/0198505 A1   Aug. 5, 2010

(51) Int. Cl.
*G01C 21/34* (2006.01)
*G06F 17/30* (2006.01)
*G01C 21/26* (2006.01)

(52) U.S. Cl. ........ 701/533; 707/918; 707/920; 701/409; 701/410

(58) Field of Classification Search .......... 701/209, 701/409, 410, 533; 707/918–920
See application file for complete search history.

(56) References Cited

U.S. PATENT DOCUMENTS

| 6,202,023 | B1 | 3/2001 | Hancock et al. | 701/201 |
|---|---|---|---|---|
| 6,876,921 | B2 * | 4/2005 | Omi | 701/533 |
| 7,281,021 | B2 * | 10/2007 | Shiota et al. | 382/284 |
| 7,564,375 | B2 * | 7/2009 | Brinton et al. | 340/988 |
| 7,720,596 | B2 * | 5/2010 | Kobuya et al. | 701/426 |
| 7,805,442 | B1 * | 9/2010 | Joshi et al. | 707/736 |
| 7,920,965 | B1 * | 4/2011 | Nesbitt et al. | 701/416 |
| 8,065,291 | B2 * | 11/2011 | Knorr | 707/710 |
| 2001/0051973 | A1 | 12/2001 | Green et al. | 709/201 |
| 2002/0070934 | A1 | 6/2002 | Sakamoto et al. | 345/419 |
| 2004/0030490 | A1 | 2/2004 | Hegedus et al. | 701/200 |
| 2007/0106455 | A1 | 5/2007 | Fuchs | 701/200 |
| 2007/0146374 | A1 | 6/2007 | Riise et al. | 345/505 |
| 2007/0260628 | A1 | 11/2007 | Fuchs et al. | 707/101 |
| 2007/0294031 | A1 * | 12/2007 | Brinton et al. | 701/209 |
| 2008/0319670 | A1 * | 12/2008 | Yopp et al. | 701/301 |
| 2009/0043498 | A1 * | 2/2009 | Maethner | 701/209 |
| 2009/0216435 | A1 * | 8/2009 | Zheng et al. | 701/209 |
| 2010/0211307 | A1 * | 8/2010 | Geelen | 701/201 |

FOREIGN PATENT DOCUMENTS

JP   2002/333830   11/2002
WO   WO2006/105754  * 10/2006

OTHER PUBLICATIONS

Priedhorsky, et al. "The Computational Geowiki: What, Why, and How." GroupLens Research, Department of Computer Science and Engineering, University of Minnesota. Paper presented at Computer Supported Cooperative Work Conference. 2008.*
Search Report for European Patent Application Serial No. 10250100. 4-1236, dated Mar. 16, 2012.

* cited by examiner

*Primary Examiner* — Robert Morgan
*Assistant Examiner* — Anita Molina
(74) *Attorney, Agent, or Firm* — Frank J. Kozak; Jon D. Shutter; Adil M. Musabji

(57) ABSTRACT

A method for representing linear features in a location content management system is disclosed. A linear feature is represented using a sequence of routing points that define a unique path when routed on a map through those points. A routing point consists of latitude, longitude, and optional stack position. Stack position defines an upper or lower level of a double-decker bridge or road. The data representing the linear feature is stored outside of a geographic database.

10 Claims, 9 Drawing Sheets

METHOD FOR REPRESENTING LINEAR FEATURES IN A LOCATION CONTENT MANAGEMENT SYSTEM

REFERENCE TO RELATED APPLICATIONS

The present patent application is related to the copending patent applications filed on the same date, Ser. No. 12/362,734, entitled "METHOD AND SYSTEM FOR ASSESSING QUALITY OF LOCATION CONTENT,"; Ser. No. 12/362,751, entitled "METHOD AND SYSTEM FOR MANAGING RELATIONSHIPS BETWEEN LOCATION IDENTIFIERS,"; Ser. No. 12/362,767, entitled "METHOD AND SYSTEM FOR REFRESHING LOCATION CODE DATA,"; and Ser. No. 12/362,807, entitled "METHOD AND SYSTEM FOR EXCHANGING LOCATION CONTENT DATA IN DIFFERENT DATA FORMATS."

FIELD

The present invention relates generally to location-based services, and more particularly, relates to how to represent a linear feature that does not rely on linear features stored in a geographic database.

BACKGROUND

Various technologies have been developed that provide navigation-related and map-related services. For example, vehicle navigation systems can determine where a vehicle is located and provide directions to travel to a desired destination. Also, Internet sites are available that provide maps, directions for traveling to a desired destination from a specified starting point, and other map-related services. Further, hand-held devices are available that can determine one's position and provide a map of one's surroundings.

In order to provide these and other map-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interest, such as restaurants, hotels, airports, gas stations, stadiums, police stations, and so on.

This geographic data may be stored in a geographic database, such as a geographic database published by NAVTEQ North America, LLC of Chicago, Ill. In addition to the data obtained by a map vendor, content sources have data regarding locations in a geographic area. The content sources may provide their data to the map vendor for inclusion into the geographic database. For example, an owner of a chain restaurant may provide the map vendor with a current list of all their locations and for each of the locations the list may include address, telephone numbers, hours of operation, menu, web page address, and other information about the location.

As the amount of information stored in a geographic database increases, it becomes more difficult for the map vendor to add the third party data to the geographic database. As a result, location content management systems have been developed to allow multiple parties to provide data related to a location, which is sometimes referred to as "location content" or simply "content." The location content management system provides a link between the location content and the geographic location associated with the content. The link is a location code that the location content management system assigns to a location.

A location code may be assigned to any location where a person can travel. For example, a person may want to travel to a particular office on a particular floor in a particular building in a geographic region. Using this example, the location content management system assigns a location code to each of the office, floor, and building. The location content management system may also assign a location code to stairs and/or an elevator if the floor is not on the ground level of the building. By assigning location codes in this manner, a navigation system can provide route guidance to a user for traveling to the office within the building.

While the location content management system provides a way for multiple parties to provide content regarding a location, there continues to be room for new features and improvements in the location content management system. One area for improvement is how to represent linear features in the location content management system. The location code references a point location minimally identified by latitude and longitude. However, in some situations it would be beneficial for a location code to reference a linear feature.

As a linear location code, like the point location code, necessarily remains outside a geographic database, the geographic database's two representations of linear objects, links and strands, are not suitable for representing linear features in the location content management system. A link is a geographic object with two nodes (a reference node and a non-reference node) and zero or more intermediate shape points. A strand is a directed sequence of links used by conditions defined in the geographic database. Links suffer from the problem of being split and merged due to attribution requirements, while strands suffer from the problem of being so tightly coupled to conditions that the strand can only be referenced by the condition. Thus, the linear location code needs to represent a linear feature in a manner that overcomes the problems associated with links and strands.

SUMMARY

A method for representing linear features in a location content management system is disclosed. The method defines a linear location code for a linear feature. The linear location code consists of a sequence of routing points where a routing point consists of latitude, longitude, and an optional stack position (e.g., L for lower and U for upper) or altitude that defines a unique path when routed on a map through those points. The stack position is used to disambiguate vertically stacked roads, such as a double-decker bridge (e.g., the San Francisco/Oakland Bay Bridge) or streets having upper and lower sections (e.g., Michigan Avenue and Wacker Drive in Chicago). Beneficially, the method represents linear features independently from link and strand objects stored in a geographic database.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
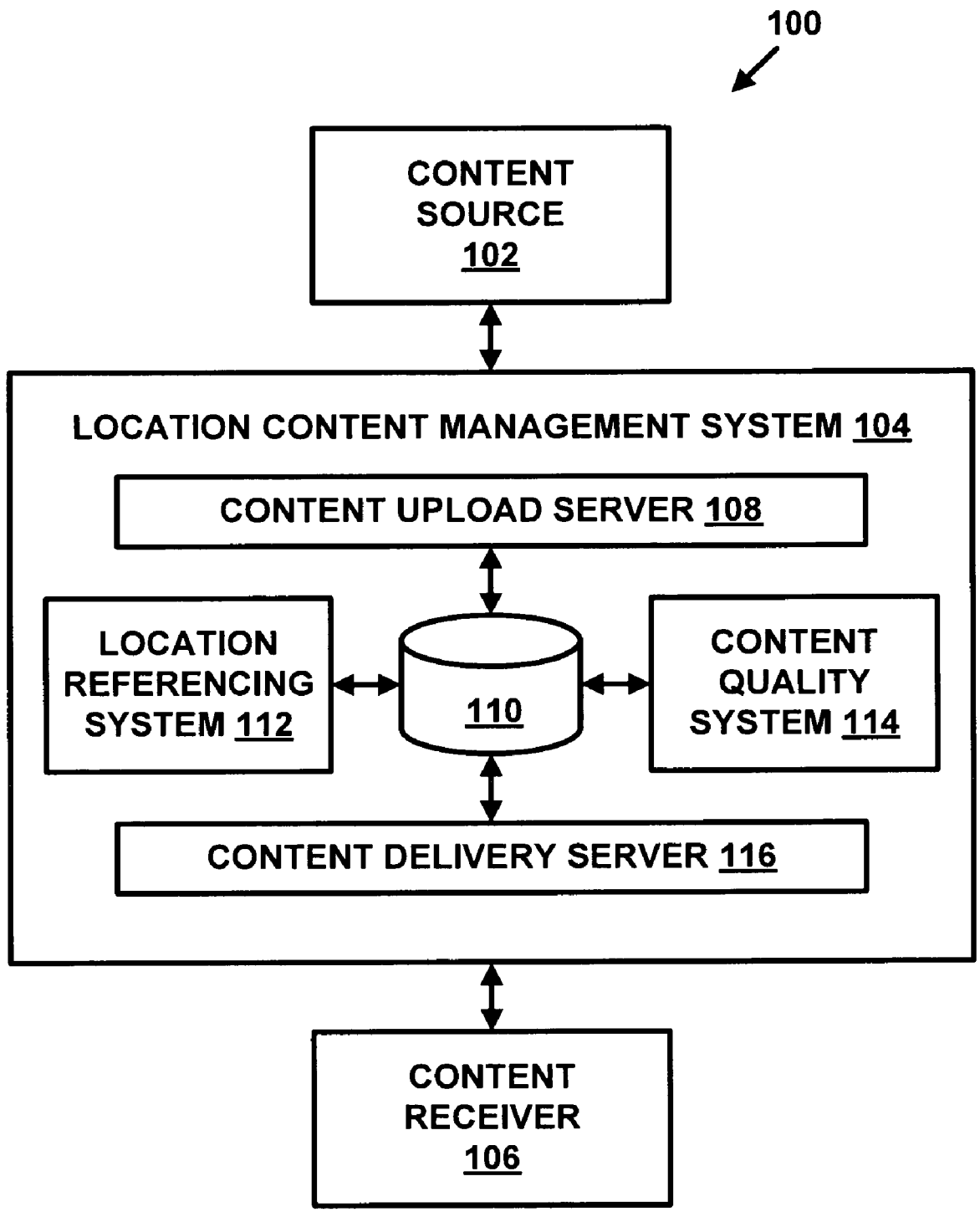
FIG. 1 is a block diagram of a location-based system, according to an example.

FIG. 1 is a block diagram showing a location-based system 100. The location-based system 100 includes a content source 102, a location content management system 104, and a content receiver 106. The location content management system 104 obtains content from the content source 102. The location content management system 104 provides content to the content receiver 106. In some situations, the content source 102 and the content receiver 106 may be the same entity.

The content is any information associated with a location. The information may be static content (i.e., does not change frequently), such as a street address, a telephone number, a fax number, and hours of operation. The information may be dynamic content (i.e., changes frequently), such as gas prices, weather reports, air travel status, and traffic reports. The information may be in any format, including text, two-dimensional images, three-dimensional images, video, multimedia, and so on.

The content source 102 is any entity that provides content to the location content management system 104. For example, the content source 102 may be a map vendor, a location owner/operator, a government agency, a chamber of commerce, an individual, or any other party. While one content source 102 is depicted in FIG. 1, it is understood that the location content management system 104 obtains content from many content sources.

The content receiver 106 is any entity that accesses content from the location content management system 104. The content receiver 106 may be an end-user device, such as a personal computer, a mobile telephone, and a portable hand-held device. Additionally, the content receiver 106 may be an intermediate device that distributes location content to an end-user device. While one content receiver 106 is depicted in FIG. 1, it is understood that the location content management system 104 provides content to many content receivers.

The location content management system 104 is a combination of hardware, software, and/or firmware that gathers, processes, and delivers location content. The location content management system 104 includes a content upload server 108, a content store 110, a location referencing system 112, a content quality system 114, and a content delivery server 116. The location content management system 104 may include other entities as well.

The content upload server 108 may display a user interface for providing location content to the location content management system 104. The user interface allows the content source 102 to enter, manage, and locate their content in a self-serve environment. The user interface may include a tool for inputting location information that includes fields that correspond to the data stored in the profile. The user interface allows the content source 102 to enter text and attach files, such as documents, image files, video files, sound files, and so on.

Additionally or alternatively, the content upload server 108 may provide a Web service to support machine-to-machine interaction over a network. The Web service may support any protocol. The content source 102 may use the Web service to add or modify location content via bulk load.

The content upload server 108 also verifies the content source 102. The content upload server 108 may verify an individual, a business, and/or an organization with any suitable method or combination of methods including, but not limited to, a double opt-in routine, community validation, manual validation, and partner validation.

The content upload server 108 stores the content in the content store 110. The content store 110 may be any type of memory that allows read/write access. The content upload server 108 may also store an indication of what verification method was used to verify the content source 102 in the content store 110 or in a separate memory device. For example, the indication may be a binary flag, scaling factor, or word identifying the verification method.

The location referencing system 112 provides a link between location content and the geographic location associated with the content. The link is needed when the location content is decoupled from (i.e., not included in) the geographic database. In order to decouple the content from the geographic database, the location referencing system 112 assigns a location identifier to one or more locations, and stores the location identifier in the content store 110. The location identifier may be a point location code or a linear location code.

The point location code references a point feature (e.g., a point on a road, a position of a building, a point within a building). A point location code is minimally represented by latitude and longitude attributes. The point location code may also be associated with an address that allows the point location code to be geocoded to a geographic database link. Geocoding is the process of geographically associating an entity outside a geographic database (e.g., a location code) to a map object within the geographic database.

The linear location code references a linear feature, such as a portion of a road network or a portion of a pedestrian route. The linear location code consists of a sequence of routing points that defines a unique path when routed on a map through those points. A routing point has latitude, longitude, and optionally a stack position used for roads and bridges having two levels (i.e., upper and lower levels). Additionally or alternatively, the routing point may have an altitude. For example, the routing point may have an altitude relative to sea level, an altitude relative to ground level, or relative to another reference level.

The sequence of routing points may be obtained by defining a canonical (i.e., normalized) representation of routing points. For example, the canonical representation may use key decision points. As another example, the canonical representation may use a segment point half-way between two key decision points. A key decision point is where a driver has to turn or otherwise make a choice between two or more alternatives (e.g., a fork in the road). Other canonical forms may also be used. The canonical representation is unique for a given linear feature despite what intermediate points are used to initially define the linear location code. The canonical representation of routing points is further described with reference to FIG. 4.

The linear location code may reference a line, polyline, or polygon object. A line location code represents a continuous line composed of one straight line segment and is defined by two routing points. A polyline location code represents a continuous line composed of two or more straight line segments, and is defined by three or more routing points. A polygon location code represents a closed path composed of three or more straight line segments, and is defined by three or more routing points. The linear location code attributes are further described with reference to FIG. 2.

The location referencing system 112 may randomly assign a location identifier to a location. Alternatively, the location referencing system 112 may assign the location identifiers in numerical order or in any other organized fashion. The location identifier may be a numerical value. For example, the location identifier may be a 16-bit number, a 32-bit number, a 64-bit number, and so on. Alternatively, the location identifier may include a combination of numbers, letters, and/or characters.

Before assigning a location identifier to a linear feature, the location referencing system 112 may first determine whether the linear feature has already been associated with a linear location code. For a line location code, the location referencing system 112 determines whether the two routing points associated with the line feature are within a predetermined radius (e.g., 1 meter) of two routing points associated with a line location code previously created. If there is a match, then the new line location code is not created. Otherwise, the new line location code is assigned to the linear feature.

For a polyline or polygon location code, the matching algorithm takes into consideration whether the number of routing points is the same between an existing linear location code and the new linear location code. When the new linear location code has the same number of routing points as an existing polyline or polygon location code, the matching algorithm uses a predetermined radius around each of the existing routing points to identify a match. This procedure is similar to the line location code matching algorithm with more routing points.

When the number of routing points is not the same, then the matching algorithm determines whether the routing points that do not match pre-existing points are within a predetermined perpendicular distance from a line segment. If the extra points are within the predetermined perpendicular distance, then these points are considered to be intermediate points not necessary to define a linear location code. In this case, a match is found and a new linear location code will not be created. This process is further described with respect to FIGS. 8 and 9.

The content quality system 114 evaluates the quality of the location content stored in the content store 110. The evaluation may be based on whether the content owner is trustworthy, the location data is accurate, the content is sufficiently complete, and/or the content is relatively current. The content quality system 114 stores a quality score for the content in the content store 110 or other memory device. The content quality system 114 may re-evaluate the content quality each time the content is changed, at a regular interval, at the request of the content source 102 and/or the content receiver 106, or at any other time. The content quality system 114 may store the historical quality scores for the content so that the content source 102 and/or the content receiver 106 can retrieve a score trend report.

The content delivery server 116 displays a user interface for retrieving location content from the location content management system 104. The user interface may be the same user interface used by the content source 102 or a separate user interface. Additionally or alternatively, the content delivery server 116 may provide a Web service in a similar manner as the content upload server 108. The user interface/Web service allows the content receiver 106 to obtain location content in a self-serve environment. The user interface/Web service also allows the content receiver 106 to receive one or more quality scores associated with the obtained content from the location content management system 104.

Figure 2:
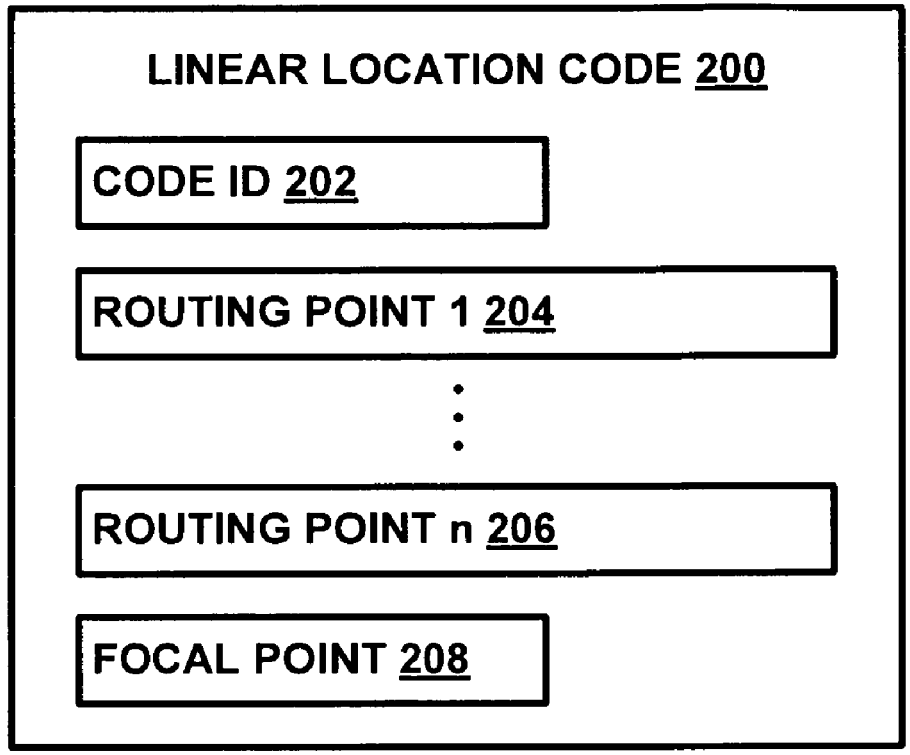
FIG. 2 is a block diagram of a data structure for a linear location code, according to an example.

FIG. 2 is a data structure for a linear location code record 200. The data attributes depicted in FIG. 2 include a code identification 202, two or more routing points 204, 206, and a focal point 208. The linear location code record 200 may have other attributes as well.

The linear location code record 200 includes a unique code identification 202 assigned by the location referencing system 112. The routing points 204, 206 define a unique path when routed on a map through those points. When the linear location code record 200 includes two routing points, the linear location code represents a continuous line composed of one straight line segment. When the linear location code record 200 includes three or more routing points, the linear location code represents a polyline or a polygon. The polyline is a continuous line composed of two or more straight line segments. The polygon is a closed path composed of three or more straight line segments. Each of the line, polyline, and polygon location codes are treated as single objects.

The focal point 208 is a point used for responding to a request for location codes in a region. For a line location code, the focal point 208 is a center point of the line segment. For polyline or polygon location codes, the focal point 208 is a centroid of the connected segments. The centroid is an average position of all points within the object. The focal point 208 may be automatically calculated by the location referencing system 112. For example, the location referencing system 112 may use the SDO_CENTROID function in Oracle 11 g. The focal point 208 may also be manually defined and/or adjusted by the end user.

Figure 3:
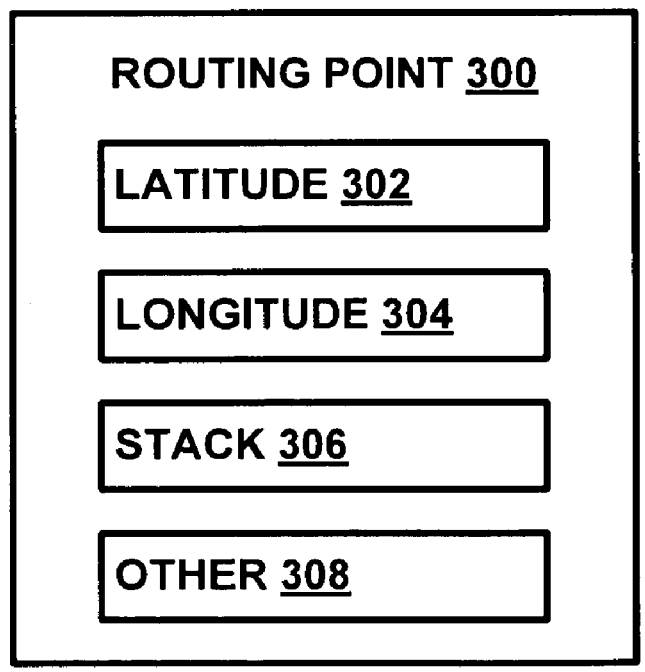
FIG. 3 is a block diagram of a data structure for a routing point, according to an example.

FIG. 3 is a data structure for a routing point record 300. The data attributes depicted in FIG. 3 include latitude 302, longitude 304, and stack 306. The stack attribute 306 is used to disambiguate vertically stacked roads, such as a double-decker bridge (e.g., the San Francisco/Oakland Bay Bridge) or streets having upper and lower levels (e.g., Upper and Lower Wacker Drive in Chicago). As this is not an exhaustive list of all the data attributes for the routing record 300, FIG. 3 also depicts other attributes 308. For example, the routing point record 300 may also include attributes for altitude (e.g., absolute or relative), street address, and so on. Additionally, the stack attribute 306 may be replaced by an altitude attribute.

FIG. 4 is a pictorial representation of an example linear feature 400 (highlighted with the dashed-line). The linear feature 400 is a path through the Ohio Street ramp to the southbound Kennedy Expressway in Chicago. The linear feature 400 has a starting point 402 and an ending point 406. The linear feature 400 also has two key decision points 403, 405.

Figure 4A:
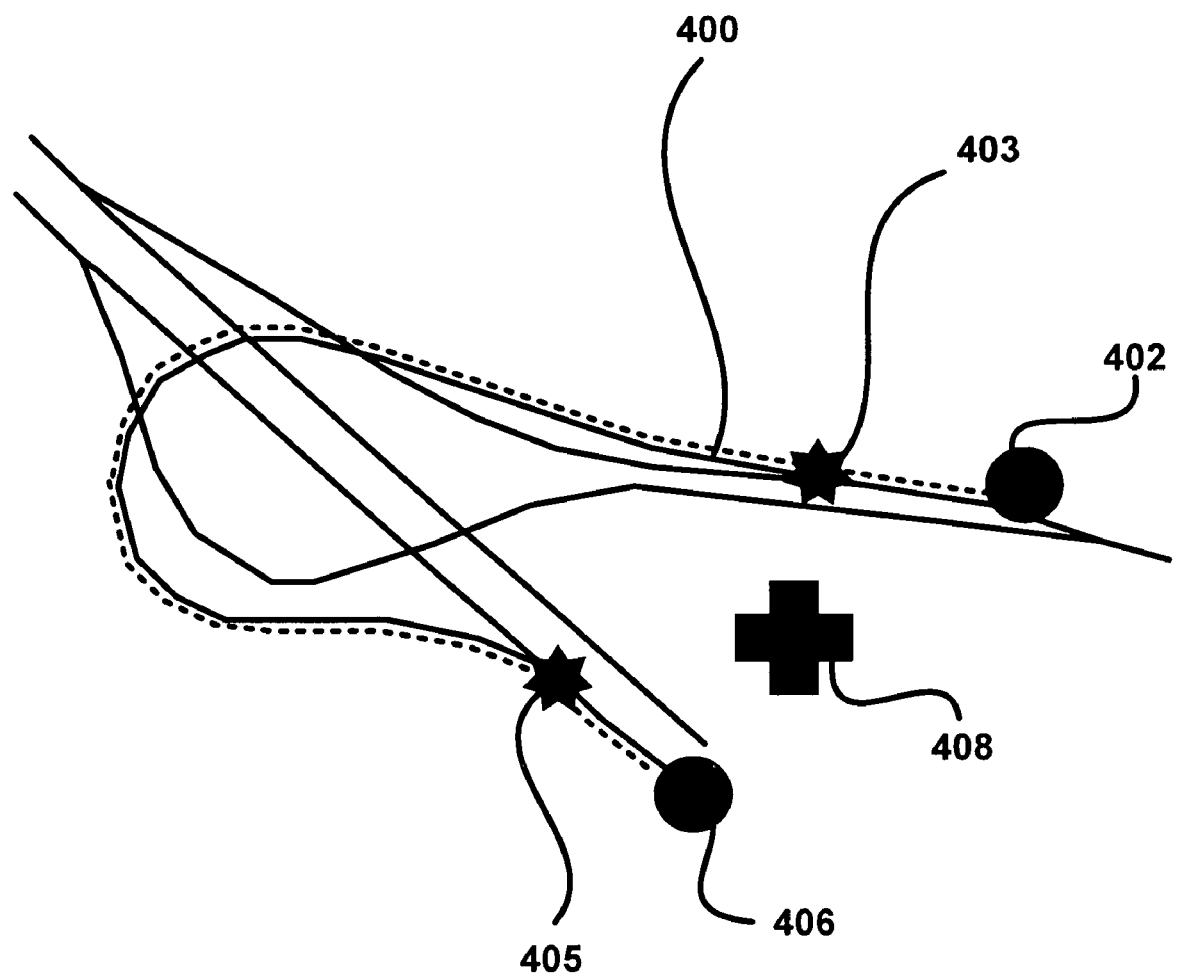
FIG. 4 is a pictorial representation of an example linear feature.
Figure 4B:
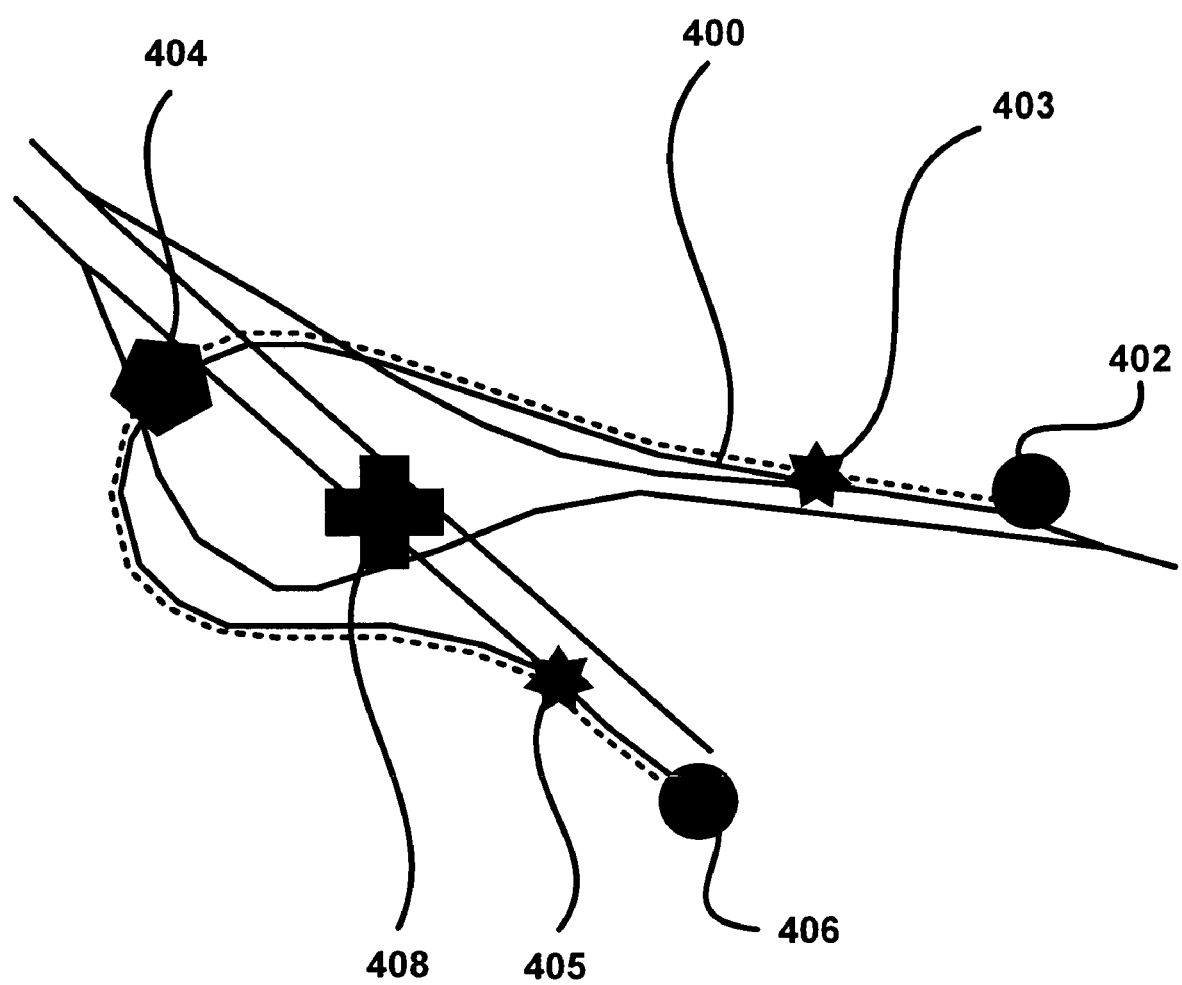

The linear feature 400 may be uniquely defined using four routing points located at the starting point 402, the ending point 406, and the two key decision points 403, 405 as shown in FIG. 4A (i.e., key decision point canonical form). Alternatively, the linear feature 400 may be uniquely defined using three routing points located at the starting point 402, the ending point 406, and a segment point 404 located half-way between the two key decision points 403, 405 as shown in FIG. 4B (i.e., segment point half-way between two key decision points canonical form). The linear feature 400 is also defined by a focal point 408 as shown in FIGS. 4A and 4B.

Figure 5:
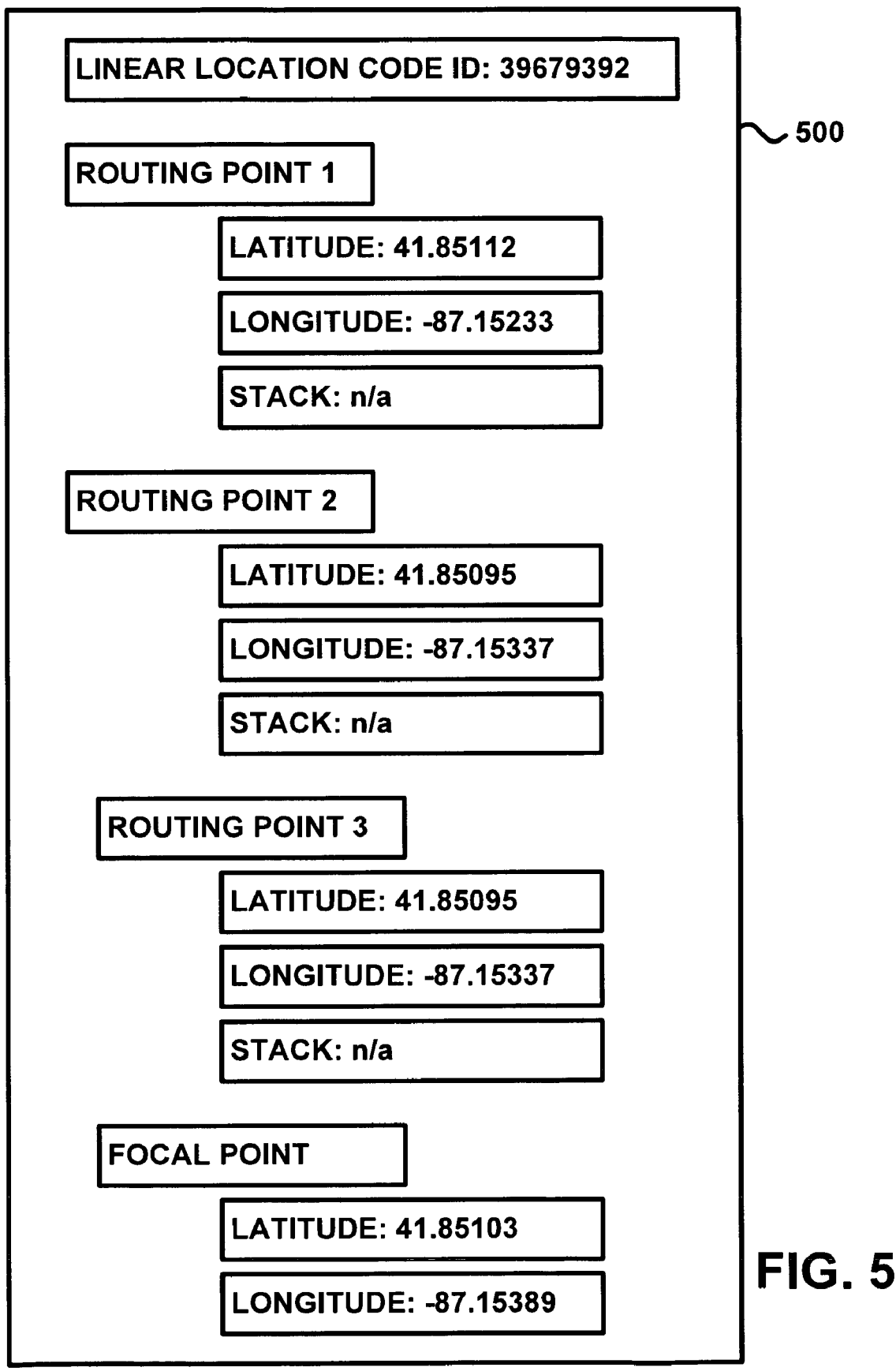
FIG. 5 is a block diagram of a data structure for the linear feature depicted in FIG. 4B; according to an example.

FIG. 5, depicts a linear location code 500 that may represent the linear feature 400. In this example, the linear location code 500 includes data using the segment point half-way between two key decision points canonical form as depicted in FIG. 4B. A linear location code that represents the linear feature 400 that includes data using the key decision point canonical form would include an additional routing point. While the linear location code 500 does not depend on objects stored a geographic database (e.g., links, strands), the data associated with the code 500 is geocodable.

The linear location code's routing points are matched (snapped) to data in the geographic database using reverse geocoding. Reverse geocoding is the process of resolving a latitude/longitude position to a location on a link in the geographic database. The reverse geocoding process uses a set of rules. For example, if a routing point is within a predetermined distance (e.g., 5 meters) of a node, the routing point is snapped to that node and the closest link reference to the node is identified. As another example, if reverse geocoding is unable to find a link position within a predetermined distance (e.g., 50 meters), the linear location code is not snapped to a link.

The reverse geocoding process allows a routing algorithm to determine a sequence of links through the snapped-to-road-link routing points. While any appropriate routing algorithm may be used, the limited size of the linear location code objects means that sophisticated routing algorithms, such as the double-star routing algorithm, are not required.

Figure 6:
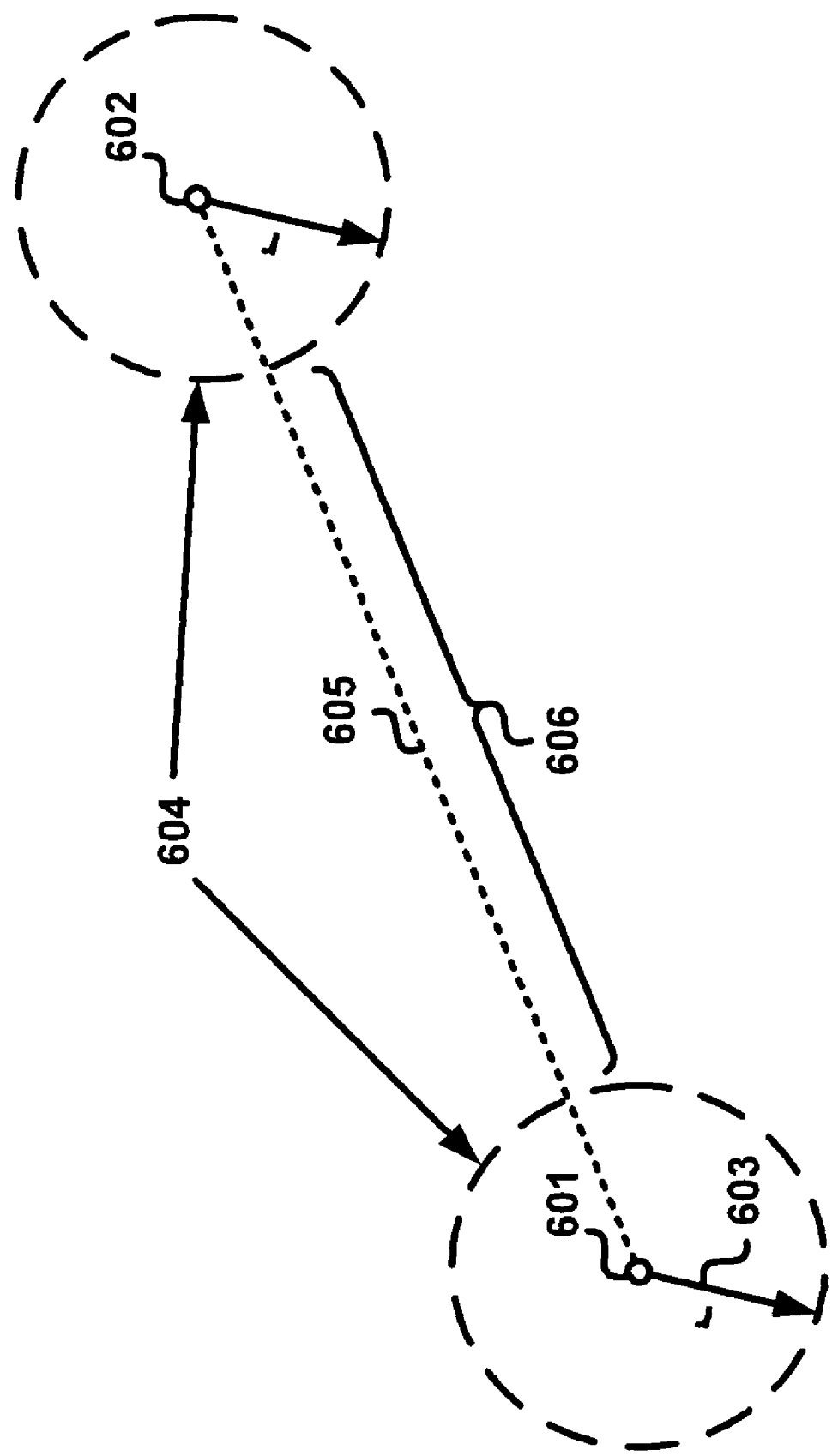
FIG. 6 is a pictorial representation of two point location codes representing two train stations and the route between the stations, according to an example.

FIG. 6 is a pictorial representation of two point location codes 601, 602 representing two train stations and a route 605 between the two stations. Due to the limitations of point based location referencing mechanisms, the route information is only implicitly defined in FIG. 6. The point location codes 601, 602 are associated with location content 604 stored in the location content store 110. The location content 604 may include the hours of operation, telephone numbers, ticket prices, train schedules, and images of the station buildings, tracks, and railroad cars. The location content 604 may be limited to a radial distance 603 from the stations. In the point location code example depicted in FIG. 6, location content is unavailable between the two radial distances 603 from the point location codes 601, 602 associated with the train stations.

Figure 7:
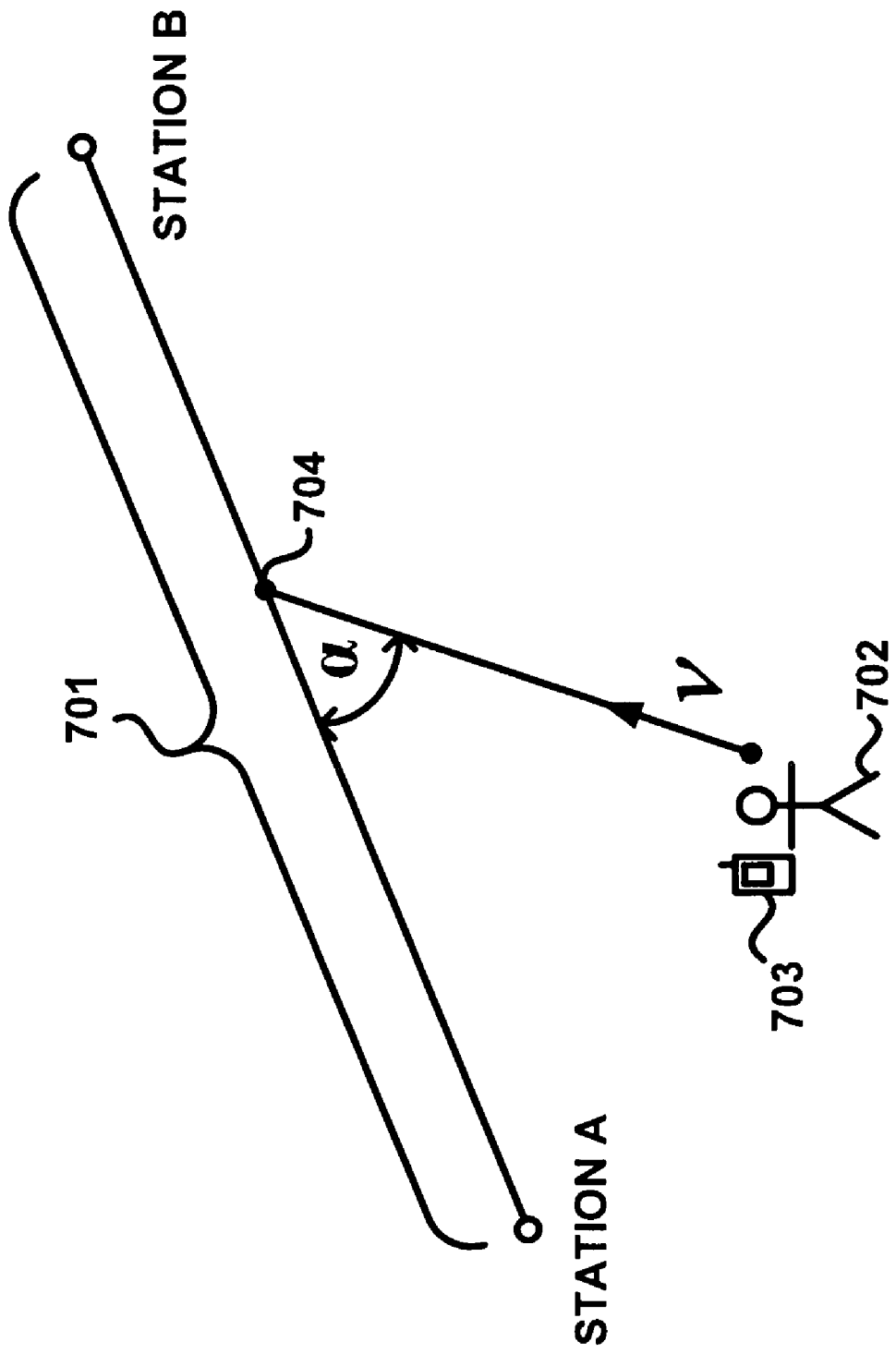
FIG. 7 is a pictorial representation of a linear location code representing the same two stations and the route between the stations depicted in FIG. 6, according to an example.

FIG. 7 is a pictorial representation of a linear location code 701 representing the same two train stations depicted in FIG. 6. In this example, location content is associated with the linear location code 701. A person 702 with a handheld device 703 is moving towards a point 704 between the two train stations to determine position. The handheld device 703 includes a positioning system that may utilize GPS-type technology, a dead reckoning-type system, or combinations of these or other systems. The positioning system may include suitable sensing devices that measure the traveling distance speed, direction, orientation, and so on.

With the handheld device's determination the device's position (latitude, longitude, altitude), speed (v), and direction towards the linear feature (compass reading, a), the device 703 may obtain location content particular to the person's travels, which would otherwise be unavailable in the example depicted in FIG. 6. For example, the device 703 may obtain images that reflect the person's view as he walks. Additionally, if the device 703 knows the date and time, the device 703 may also provide content regarding when the next train will pass by the point 704.

A linear location code may also be used to more easily represent features previously stored within the geographic database. For example, junction view conditions, which associate image files to a path through a highway exit decision point, may be replaced with a junction view object defined outside the geographic database. The junction view object associates a linear location code with a set of image files. As another example, No Passing zones that start in the middle of one link and end somewhere in another link may be modeled using a linear location code rather than breaking links to form a condition strand. Other features stored in the geographic database, such as evacuation or snow routes, may also benefit from being modeled outside the geographic database using a linear location code.

Figure 8:
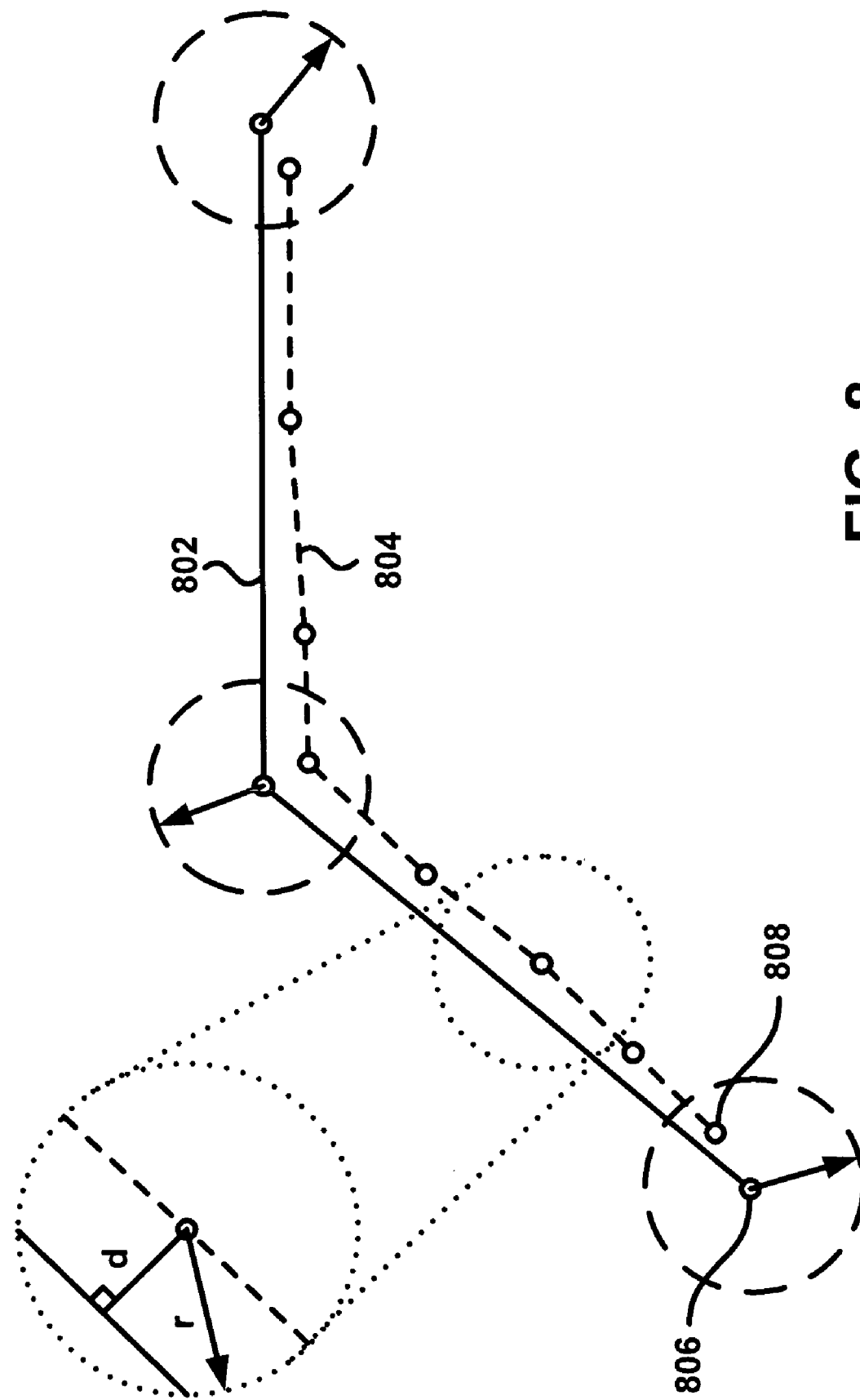
FIG. 8 is a pictorial representation of an existing polyline location object and a potential new polyline location object; according to an example.
Figure 9:
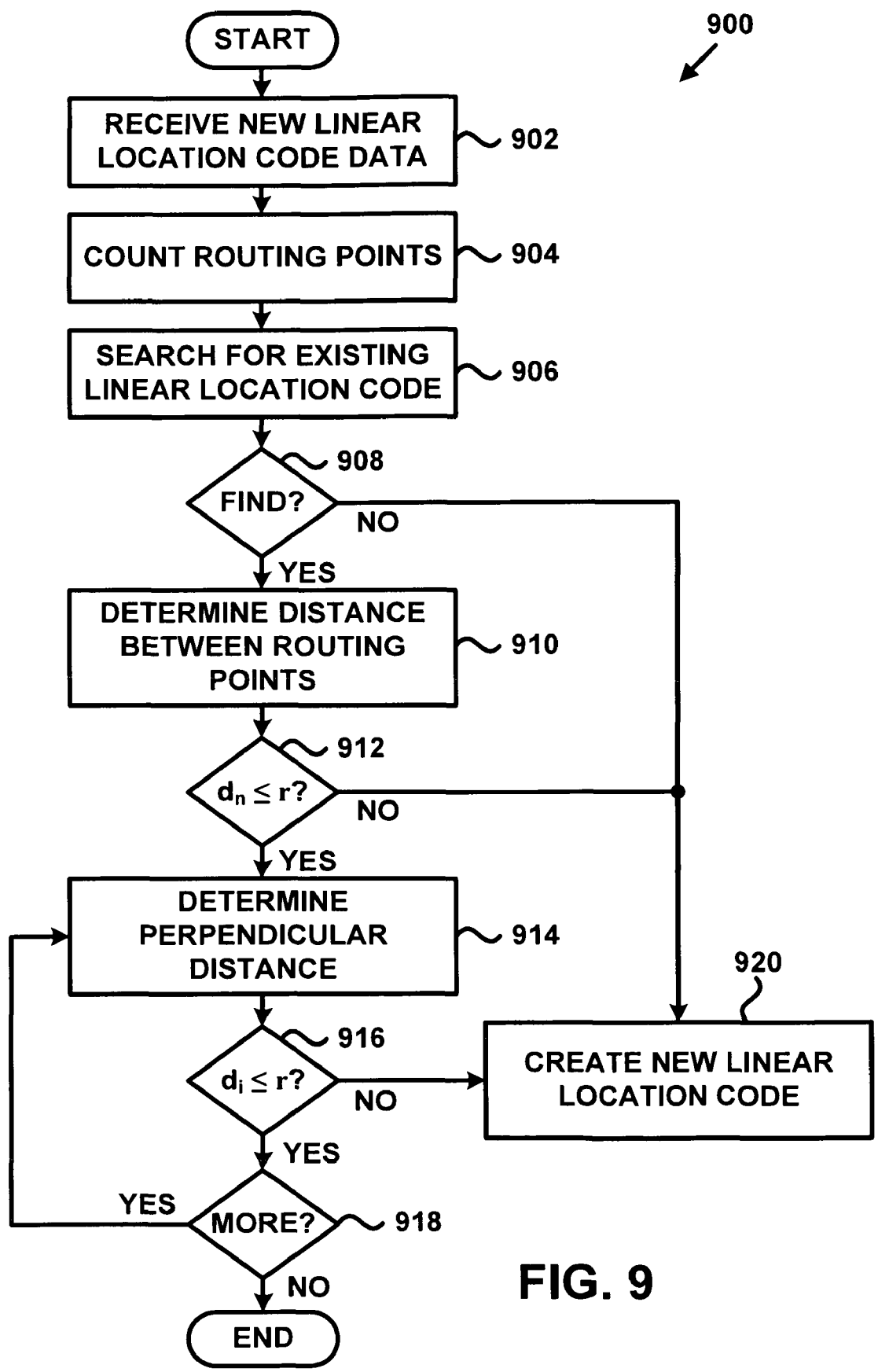
FIG. 9 is a flow chart of a matching routine for determining whether to assign a linear location code to the potential new polyline location object depicted in FIG. 8, according to an example.

FIG. 8 is a pictorial representation of an existing polyline location object 802 and a potential new polyline location object 804. The existing polyline location object 802 has three routing points 806, while the potential new polyline location object 804 has eight routing points 808. FIG. 9 is a flow chart of a matching routine 900 that may be used to determine whether to assign a new linear location code to the potential new polyline location object 804.

At block 902, the routine 900 receives data for the new object 804. The data includes the latitude, longitude, and optionally stack level or altitude for each of the routing points 808 defining the new object 804. At block 904, the routine 900 counts the number of routing points 808 defining the new object 804. In the example shown in FIG. 8, the routine 900 counts eight routing points 808.

At block 906, the routine 900 searches for an existing linear location code that has a routing point within a predetermined radial distance (r) from the first routing point defining the new object 804. For example, the predetermined distance may be three meters. If no existing linear location code is identified at block 908, then at block 920, the routine 900 creates a new linear location code.

If an existing linear location code is identified at block 908, then at block 910, the routine 900 determines the distance ($d_n$) between the routing points evaluated at block 908. At block 912, the routine 900 determines whether the distance is less than or equal to the pre-determined radial distance ($d_n \leq r$). If the distance is greater than the radial distance ($d_n > r$), the routine 900 creates a new linear location code at block 920.

If the radial distance is less than or equal to the pre-determined radial distance ($d_n \leq r$), the routine 900 determines the perpendicular distance ($d_i$) between the next routing point and the linear feature represented by the existing linear location code at block 914. At block 916, the routine 900 determines whether the perpendicular distance is less than or equal to the pre-determined radial distance ($d_i \leq r$). If the distance is greater than the perpendicular distance ($d_i > r$), the routine 900 creates a new linear location code at block 920.

If the perpendicular distance is less than or equal to the pre-determined radial distance ($d_n \leq r$), the routine 900 determines whether there are any additional routing points 808 to evaluate at block 918. If there are additional routing points 808, then the routine 900 returns to block 914 to evaluate the routing points. The routine 900 continues until a new linear location code is created at block 920 or a match is found with an existing linear location code. If a match is found, the routine 900 does not create a new linear location code.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for representing linear features in a location content management system, comprising;
   the location content management system identifying a number and location of routing points needed to uniquely define a linear feature, wherein the linear feature is one of a polyline and polygon;
   the location content management system calculating a focal point that is a centroid of the identified routing points;
   the location content management system storing data for the identified routing points and the focal point as a unique linear location code; and
   the location content management system providing the unique linear location code to users of the location content management system for obtaining location content associated with the linear feature
   further comprising running a matching routine to determine if the linear feature has been previously assigned a linear location code.

2. The method of claim 1, wherein the data includes latitude and longitude for the identified routing points.

3. The method of claim 1, wherein the data includes a stack position if the linear feature includes a double-decker road.

4. The method of claim 1, wherein the linear location code is associated with one of a polyline and a polygon object.

5. As system for representing linear features in a location content management system, comprising:
   a user interface that allows a content source to provide location content associated with a linear feature in a geographic region, wherein the linear feature is one of a polyline and a polygon;
   a data store that stores the location content associated with the linear feature; and
   a location referencing system that assigns a linear location code to the stored location content and stores the linear location code in the data store, wherein the linear location code includes a code identifier, a sequence of routing points that uniquely identify the linear feature, and a focal point that is a centroid of the sequence of routing points, wherein the location referencing system uses the focal point for responding to a request for location codes in a region; and wherein a content receiver can obtain the location content from the location content management system by entering the linear location code into the user interface.

6. The system of claim 5, wherein the location referencing system is operable to calculate the focal point for the linear location code.

7. The system of claim 5, wherein the location referencing system is operable to determine whether to assign the linear location code based on previously stored linear location codes.

8. A method for extracting location content based on user's current location, direction, and speed with respect to a linear feature that the user is moving towards, comprising;
   obtaining data associated with a position of a device;
   obtaining data associated with a direction of travel of the device;
   obtaining data associated with a speed of the travel of the device;
   using the data associated with the position, direction, and speed of the device to select location content associated with a linear location code that references a linear feature that the device is moving towards, wherein the linear feature is one of a polyline and a polygon, and wherein the linear location code includes a code identifier, a sequence of routing points that uniquely identify the linear feature, and a focal point that is a centroid of the sequence of routing points;
   using the focal point to respond to a request for location codes in a region; and
   providing the selected location content to the device.

9. The method of claim 8, further comprising using a positioning system to obtain the data associated with the device.

10. The method of claim 8, wherein the location content includes at least one image that reflects the device user's view while moving towards the linear feature.

* * * * *